(12) United States Patent
Carey et al.

(10) Patent No.: US 11,629,872 B2
(45) Date of Patent: Apr. 18, 2023

(54) SINGLE PASS KILL AIR PURIFIER SYSTEM AND PROCESS OF OPERATION

(71) Applicant: NQ Industries, Inc., Hamden, CT (US)

(72) Inventors: William Carey, West Hartford, CT (US); Peter Broadbridge, Plantsville, CT (US)

(73) Assignee: NQ INDUSTRIES, INC., Hamden, CT (US)

( * ) Notice: Subject to any disclaimer, the term of this patent is extended or adjusted under 35 U.S.C. 154(b) by 60 days.

(21) Appl. No.: 17/228,188

(22) Filed: Apr. 12, 2021

(65) Prior Publication Data

US 2022/0325909 A1 Oct. 13, 2022

(51) Int. Cl.
| | |
|---|---|
| *B01D 29/56* | (2006.01) |
| *B01D 46/00* | (2022.01) |
| *F24F 8/22* | (2021.01) |
| *F24F 8/80* | (2021.01) |
| *F24F 8/158* | (2021.01) |
| *F24F 8/108* | (2021.01) |
| *B01D 46/62* | (2022.01) |

(52) U.S. Cl.
CPC ............... *F24F 8/22* (2021.01); *B01D 29/56* (2013.01); *B01D 46/0005* (2013.01); *B01D 46/0027* (2013.01); *B01D 46/62* (2022.01); *F24F 8/108* (2021.01); *F24F 8/158* (2021.01); *F24F 8/80* (2021.01)

(58) Field of Classification Search
CPC ............... B01D 29/56; B01D 46/0002; B01D 46/0005; B01D 46/0027; B01D 46/62
See application file for complete search history.

(56) References Cited

U.S. PATENT DOCUMENTS

| | | | |
|---|---|---|---|
| 2,478,393 | A | 8/1949 | Haarman |
| 2,553,711 | A | 5/1951 | Jackson |
| 2,709,954 | A | 6/1955 | Baker |
| 3,299,620 | A | 1/1967 | Hollingworth |
| 3,347,025 | A | 10/1967 | Wiley |
| 3,518,046 | A | 6/1970 | Cicirello |
| 3,576,593 | A | 4/1971 | Cicirello |
| 3,683,638 | A | 8/1972 | Devon |
| 3,757,495 | A | 9/1973 | Sievers |
| 3,804,942 | A | 4/1974 | Kato et al. |
| 3,812,370 | A | 5/1974 | Laviolette |
| 4,210,429 | A | 7/1980 | Golstein |
| 4,339,250 | A | 7/1982 | Thut |

(Continued)

FOREIGN PATENT DOCUMENTS

| | | | | |
|---|---|---|---|---|
| CN | 204254762 U | * | 4/2015 | .............. F24F 11/77 |
| CN | 111397028 A | * | 7/2020 | |

(Continued)

*Primary Examiner* — Robert A Hopkins (74) *Attorney, Agent, or Firm* — Cantor Colburn LLP (57) ABSTRACT

Air purifier systems for enclosed environments and processes for purifying air within the enclosed environments generally include four stages of filtration. The four stages of filtration include exposing the air to a carbon pre-filter followed by exposing the air to a particulate filter. The air is then fed through a photocatalytic filter and subsequently discharged back into the environment. The systems and processes deodorize, remove particulate matter and destroy airborne pathogens within the enclosed environment.

22 Claims, 8 Drawing Sheets

(56) References Cited

U.S. PATENT DOCUMENTS

| | | |
|---|---|---|
| 4,370,155 A | 1/1983 | Armbruster |
| 4,531,956 A | 7/1985 | Howorth |
| 4,737,173 A | 4/1988 | Kudirka et al. |
| 4,749,385 A | 6/1988 | Brunner et al. |
| 4,750,917 A | 6/1988 | Fujii |
| 4,772,297 A * | 9/1988 | Anzai .................... B03C 3/155 96/69 |
| 4,787,922 A | 11/1988 | Kulitz |
| 4,810,269 A | 3/1989 | Stackhouse et al. |
| 4,900,344 A | 2/1990 | Lansing |
| 4,909,815 A | 3/1990 | Meyer |
| 4,959,010 A | 9/1990 | Burtscher et al. |
| 5,069,691 A | 12/1991 | Travis et al. |
| 5,129,928 A | 7/1992 | Chan et al. |
| 5,185,015 A | 2/1993 | Searle |
| 5,225,167 A | 7/1993 | Wetzel |
| 5,240,478 A | 8/1993 | Messina |
| 5,290,330 A | 3/1994 | Tepper et al. |
| 5,399,319 A | 3/1995 | Schoenberger et al. |
| 5,612,001 A | 3/1997 | Matschke |
| 5,616,172 A | 4/1997 | Tuckerman et al. |
| 5,656,242 A | 8/1997 | Morrow et al. |
| 5,919,422 A | 7/1999 | Yamanaka et al. |
| 5,997,619 A | 12/1999 | Knuth et al. |
| 6,093,676 A | 7/2000 | Heller et al. |
| 6,531,100 B1 | 3/2003 | Ogata et al. |
| 6,884,752 B2 | 4/2005 | Andrews |
| 7,914,733 B2 | 3/2011 | Carey |
| 2004/0058249 A1 | 3/2004 | Cai et al. |
| 2004/0224147 A1 | 11/2004 | Chou |
| 2005/0129591 A1 | 6/2005 | Wei et al. |

FOREIGN PATENT DOCUMENTS

| | | | |
|---|---|---|---|
| EP | 0978690 A2 | 2/2000 | |
| EP | 0836527 B1 | 8/2003 | |
| EP | 1437397 A1 | 7/2004 | |
| JP | 2014213005 * | 11/2014 | |
| WO | 2005044446 A1 | 5/2005 | |
| WO | 2006111089 A1 | 10/2006 | |
| WO | WO-2012117547 A1 * | 9/2012 | ............ F24F 3/1603 |

* cited by examiner

SINGLE PASS KILL AIR PURIFIER SYSTEM AND PROCESS OF OPERATION

BACKGROUND

The present disclosure generally relates to a single pass kill air purifier, and more particularly, to a single pass kill air purifier system and process of operation for purifying an air stream, the system generally including multi-filtration including a carbon pre-filter, a particle filter and a photocatalytic filter.

Air within an enclosed space can include various organic pollutants and/or airborne pathogens that can present health issues to those exposed to the contaminated air within the enclosed space. Moreover, the presence of a large group of people within the enclosed space can rapidly increase the concentration of organic pollutants and/or airborne pathogens leaving people at increased risk of illness. For example, coronaviruses such as COVID-19 has been determined to be a highly contagious respiratory disease and is transmissible via aerosol droplets. In closed and crowded indoor settings, there is a higher risk of COVID-19 spreading compared with the outdoors, where the flow of fresh air can dilute and dissipate the virus particles. Introduction of fresh air can reduce the incidence of transmission however not all enclosed spaces have access to fresh air or lack sufficient air flow to exchange an entire room volume such that the air can be stagnant in certain areas of the enclosed space. Current heating and ventilation systems are generally not configured to protect against organic pollutants and/or airborne pathogens.

BRIEF SUMMARY

Disclosed herein is a single pass air purifier and processes for use in an enclosed environment. In one or more embodiments, the air purifier system includes a housing having an inlet opening and an outlet opening in fluid communication with a housing interior, wherein the housing interior includes an upper chamber in fluid communication with both the inlet opening and a lower chamber, wherein the lower chamber is in fluid communication with the outlet opening; a removable filter disposed at the inlet opening comprising a carbon pre-filter and a particulate filter; an ultraviolet light source and a photocatalytic filter disposed about the ultraviolet light source in the upper chamber; and a fan unit in the lower chamber, wherein the fan unit is configured to draw environmental air through the removable filter at the inlet opening and into the upper chamber, wherein the air is exposed to hydroxyl radicals generated upon exposure of the photocatalytic filter with ultraviolet radiation from the ultraviolet light source, and wherein the air is then directed by the fan unit into the lower chamber and discharged through the outlet opening for return to the environment.

In one or more other embodiment, the air purifier system includes a housing having an inlet opening and an outlet opening in fluid communication with a housing interior; a removable filter disposed at the inlet opening comprising a carbon pre-filter and a particulate filter; an ultraviolet light source configured to produce UVC radiation and a cylindrical shaped photocatalytic filter disposed about the ultraviolet light source; and a fan unit, wherein the fan unit is configured to draw environmental air through the removable filter at the inlet opening, through the photocatalytic filter, and discharged through the outlet opening for return to the environment.

A process for purifying air within an enclosed environment, the process comprising, in sequence, drawing air into a removable filter provided at an inlet opening of an air purifier system to reduce odors and particulate matter within the air; flowing the reduced odor and particulate matter air through a photocatalytic filter, wherein the photocatalytic filter comprises an ultraviolet light source and a cylindrical filter impregnated with a photocatalytic material about the ultraviolet light source to form a purified air flow; and discharging the purified air flow from an outlet opening into the enclosed environment.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are single pass kill air purifier systems for effectively and efficiently removing particles and destroying pathogens from the environment within an enclosed space. The air purifier systems generally include a carbon pre-filter disposed at an inlet of the system, a particle HEPA filter in fluid communication with air flowing through the carbon pre-filter, an upper chamber including a photocatalytic filter and an ultraviolet light source configured to activate the photocatalytic filter; and a fan unit within a lower chamber, wherein the system provides four stages of filtration. The first stage generally includes drawing air into the carbon pre-filter to primarily remove odors; the second stage generally includes removal of particulate matter entrained in the air flow; the third stage generally includes exposing the air flow to ultraviolet light for its germicidal activity; and the fourth stage includes exposing the air flow to hydroxyl radicals produced upon activation of the photocatalytic filter to the ultraviolet light source so as to react with any organic contaminants remaining in the air flow, e.g., airborne pathogens such as viruses. Carbon dioxide and water vapor are byproducts of the photocatalytic reaction with the hydroxyl radicals, which are then discharged with the air flow through an outlet opening in the system and into the external environment in which the system is disposed. In one or more embodiments, the upper chamber is coated and/or is provided with a highly reflective material such as polished aluminum mirrors, or the like to internally reflect light emitted from the ultraviolet light source, which has been found to amplify the ultraviolet dosage from the light source by a factor of about 50%. The fan unit is provided within the lower chamber and configured to direct air flow from the inlet through the outlet.

Advantageously, the single pass air purifier systems can be configured for attachment to a wall of an enclosed room. The primary mounting of the device on the wall will be on a vertical axis no lower than about 6 feet from the bottom of the unit to the floor and no closer than 8 inches from the ceiling in order to allow adequate airflow to the unit. For these embodiments, the air within the enclosed room flows through the air purifier system, which is configured to provide multiple air volume changes over a relatively short period of time within the enclosed space. The presence of one or more systems within a given enclosure will enable a typical classroom, restaurant, college lecture hall to have efficient and effective air sterilization for scrubbing the internal air spaces, which can advantageously be used to reduce viral transmission such as COVID19, for example.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Figure 1:
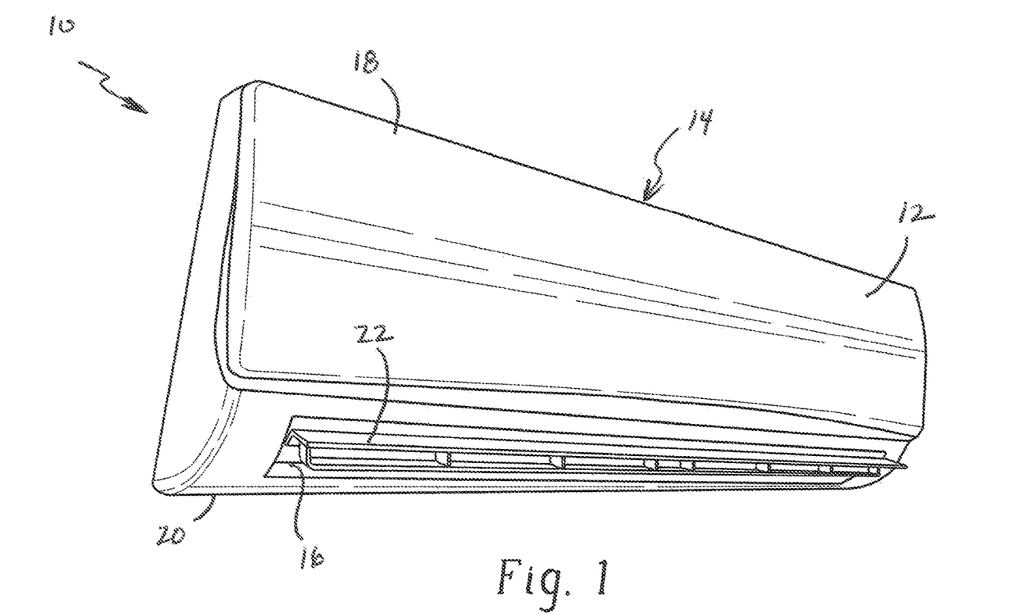
FIG. 1 ("FIG.") is a front perspective view of an air purifier system in accordance with the present disclosure.
Figure 4:
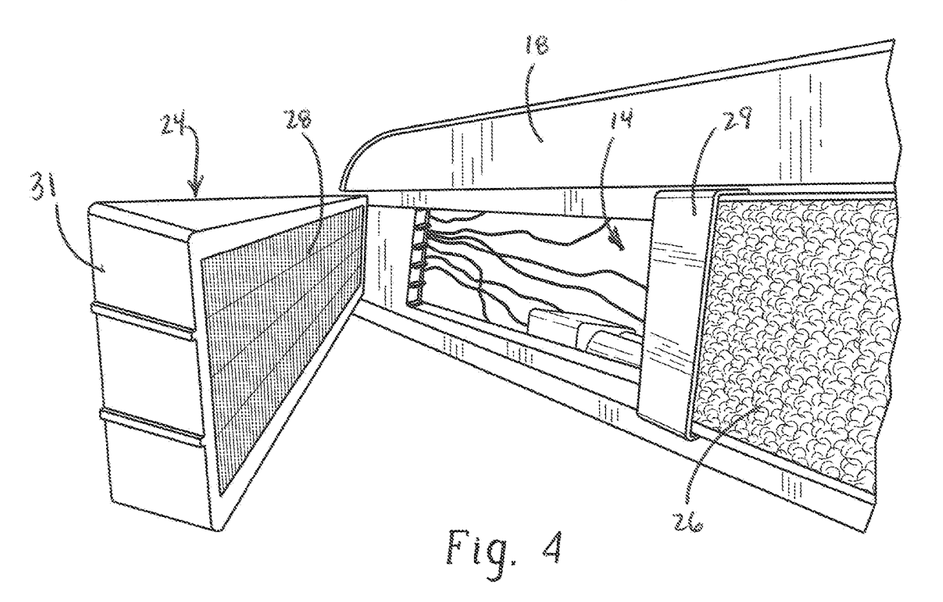
FIG. 4 is a perspective view of a partially removed removable filter disposed at an inlet opening of the air purifier system in accordance with the present disclosure.

Referring now to FIG. 1, there is shown an external perspective view of an exemplary air purifier system in accordance with the present disclosure, generally designated by reference numeral 10. The illustrated air purifier system 10 includes a housing 12 including an inlet opening 14 and an outlet opening 16. The inlet opening 14 (shown more clearly in FIG. 4) is provided in an upper housing surface 18 and the outlet opening 16 is provided in the bottom housing surface 20. The air purifier system 10 can be mounted on vertical wall in the configuration as generally shown in FIG. 1 with the outlet opening 16 oriented towards ground level and the inlet oriented upwards relative to ground level.

The housing 12 can be constructed from a material that is resistant to UV radiation as well as environmental conditions in the desired use location (e.g., thermal extremes and fluctuations, and/or moisture exposure). Possible materials include plastic (e.g., ABS plastic, polycarbonate, polyetherimide, polyvinyl chloride, polystyrene, and so forth), metal, and combinations comprising at least one of the foregoing. For example, the housing (e.g., frame, enclosure, etc.) can comprise high impact polystyrene capable of withstanding temperatures of 190° F. (88° C.) without warping or delaminating.

Figure 2:
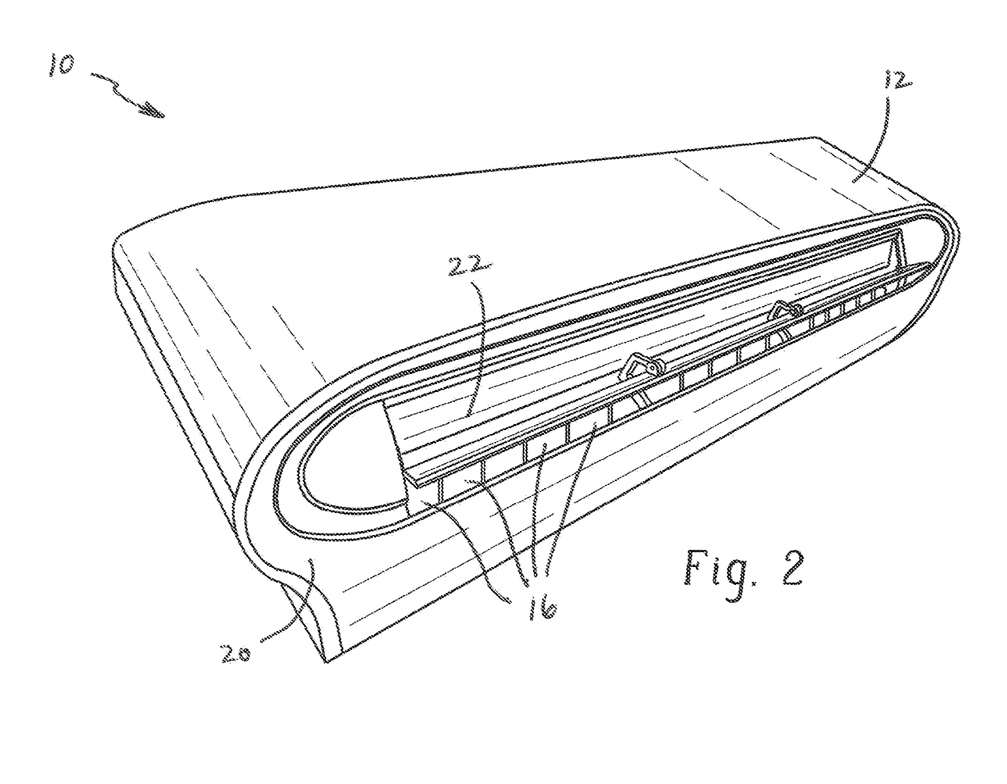
FIG. 2 is a bottom perspective view of the air purifier system of FIG. 1.

As shown more clearly in FIG. 2, the outlet opening 16 can include a directional flap 22, also referred to herein as a discharge grill, that can be positioned to guide air flow from the air purifier system into the environment. In one or more embodiments, the directional flap 22 can be movably coupled to the housing 12 and an optional motor can be used to effect movement of the directional flap 22 to differing positions, which can regulate the amount of air flow and direction into the environment, among others. Alternatively, the directional flap 22 can be manually manipulated.

Figure 3:
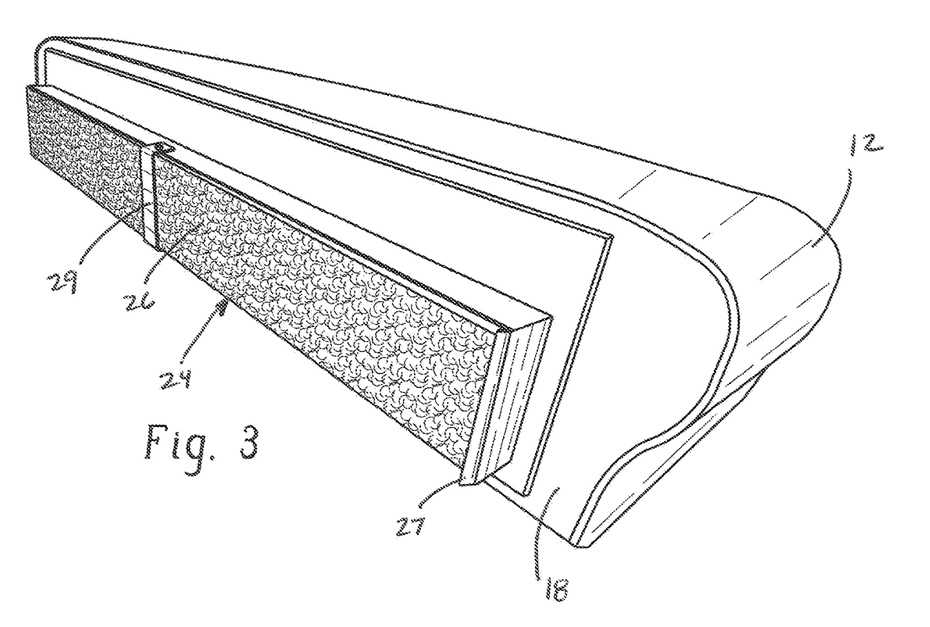
FIG. 3 is a top perspective view of the wall mounted air purifier system of FIG. 1.

FIG. 3 illustrates a perspective view of the upper housing surface 18 of the air purifier system 10. The inlet opening 14 in the upper housing surface 18 is configured to receive one or more removable filters 24, two of which are shown, extending laterally from one end to another end of the housing 12. In one or more embodiments, the removable filters 24 are rectangularly-shaped, which can be rigid or flexible. The removable filters 24 can include a porous membrane 26 overlying a pleated mechanical air filter 28 provided within a housing 31. The inlet opening 14 can include a shoulder portion 27 that is configured to cooperate with a bracket 29 to removably attach the removable filter 24 to housing 12.

In one or more embodiments, the porous membrane 26 is impregnated with carbon and functions as a pre-filter within the system. The porous membrane 26 includes an exposed external surface relative to the system interior. Optionally, instead of a porous membrane impregnated with carbon, the removable filters 24 include a pleated mechanical filter that is impregnated with carbon. The carbon can be provided on the pleated membrane surface facing the inlet opening such that air first flows through the carbon impregnated portion of the pleated mechanical filter. In this manner, when air passes through the carbon it neutralizes any smells, and when the air is passed out the back it is completely odor-free. Additionally, the carbon pre-filter blocks ultraviolet radiation from being discharged into the environment.

In one or more embodiments, the pleated mechanical air filter 28 is a high efficiency particle air (HEPA) filter media, which are commercially available in a variety of shapes, sizes and pore sizes. This type of air filter can theoretically remove at least 99.97% of dust, pollen, mold, bacteria, and any airborne particles with a size of 0.3 microns (μm) or greater. Particles that are larger than 0.3 μm are trapped within the pleated filter. The HEPA filter generally has a minimum efficiency reporting value (MERV) rating greater than 13. In one or more embodiments the MERV rating is within a range of 13 to 16. Generally, the higher the MERV rating the greater the filter is at trapping specific types of particles.

In one or more embodiments, the pleated mechanical filter media includes a pore size which decreases from the top to the bottom which facilitates the trapping of larger particles near the top and smaller particles near the bottom. Likewise, the filter media may also include multiple layers of decreasing pore size.

Figure 5:
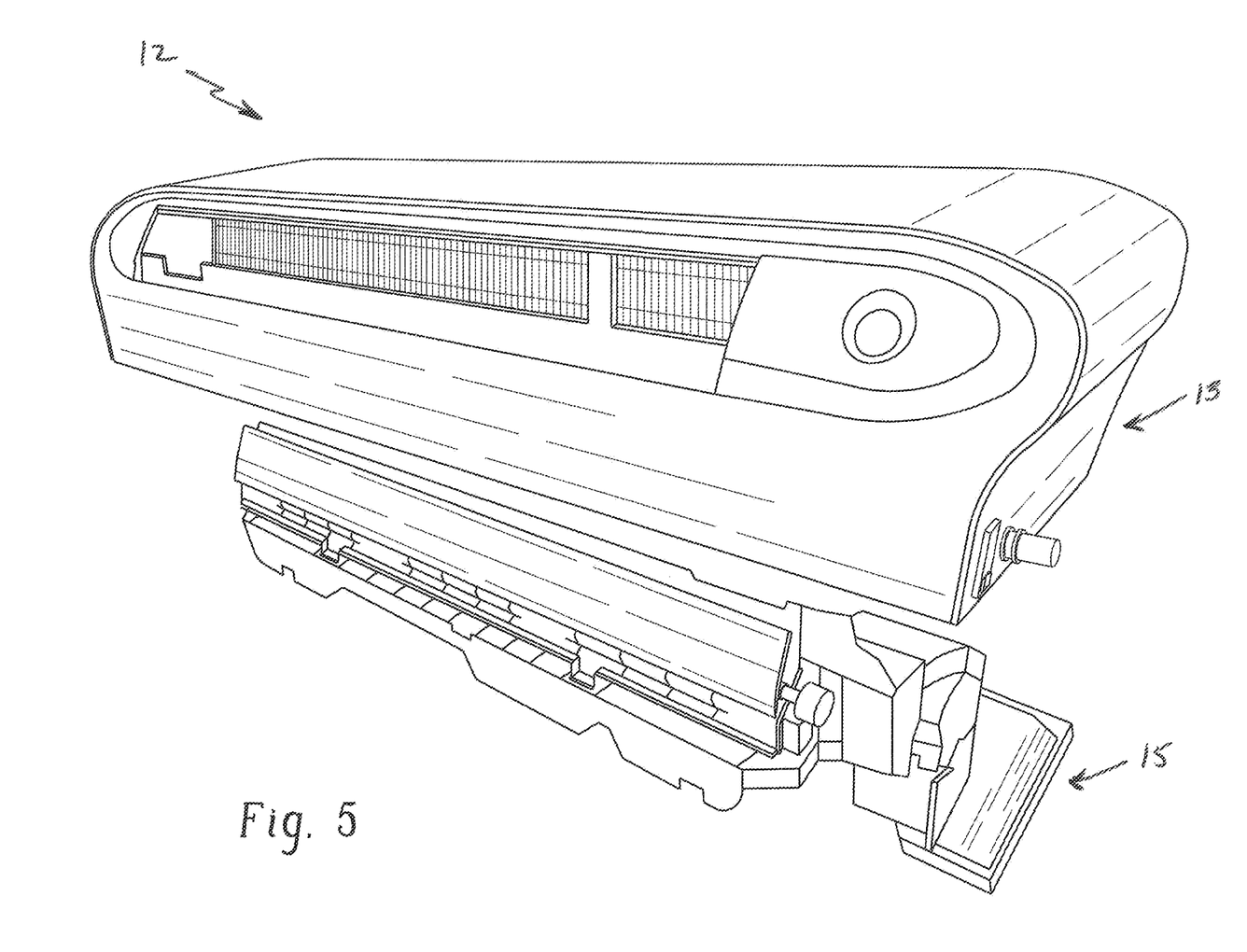
FIG. 5 is a schematic view of the air purifier system depicting the upper and lower chambers in accordance with the present disclosure.

FIG. 5 schematically illustrates a perspective view of a disassembled housing 12, which is a clam shell configuration including a first portion 13 and a second portion 15.

Figure 6:
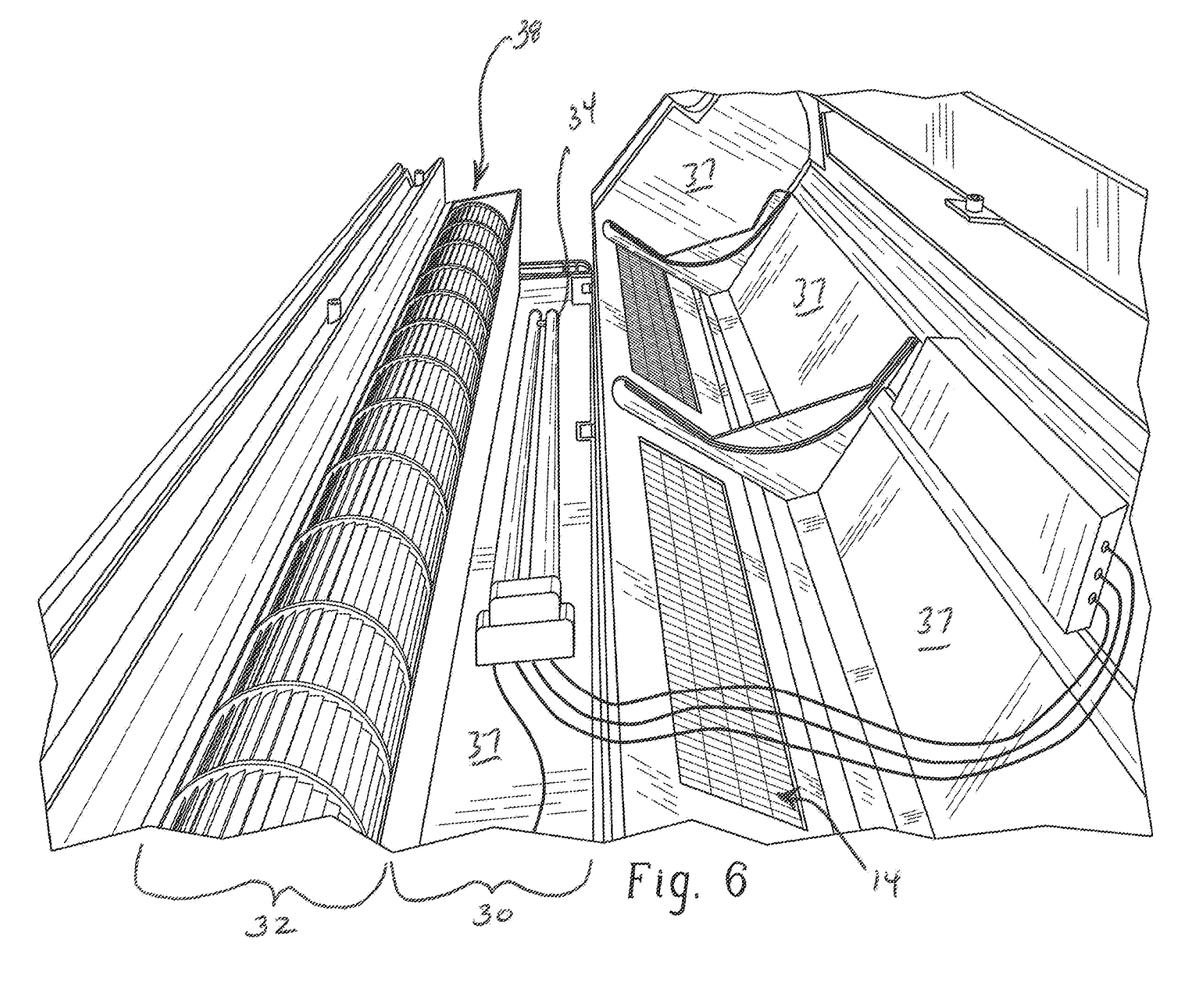
FIG. 6 is a side perspective view of the interior of the air purifier system in an opened position in accordance with the present disclosure.
Figure 7:
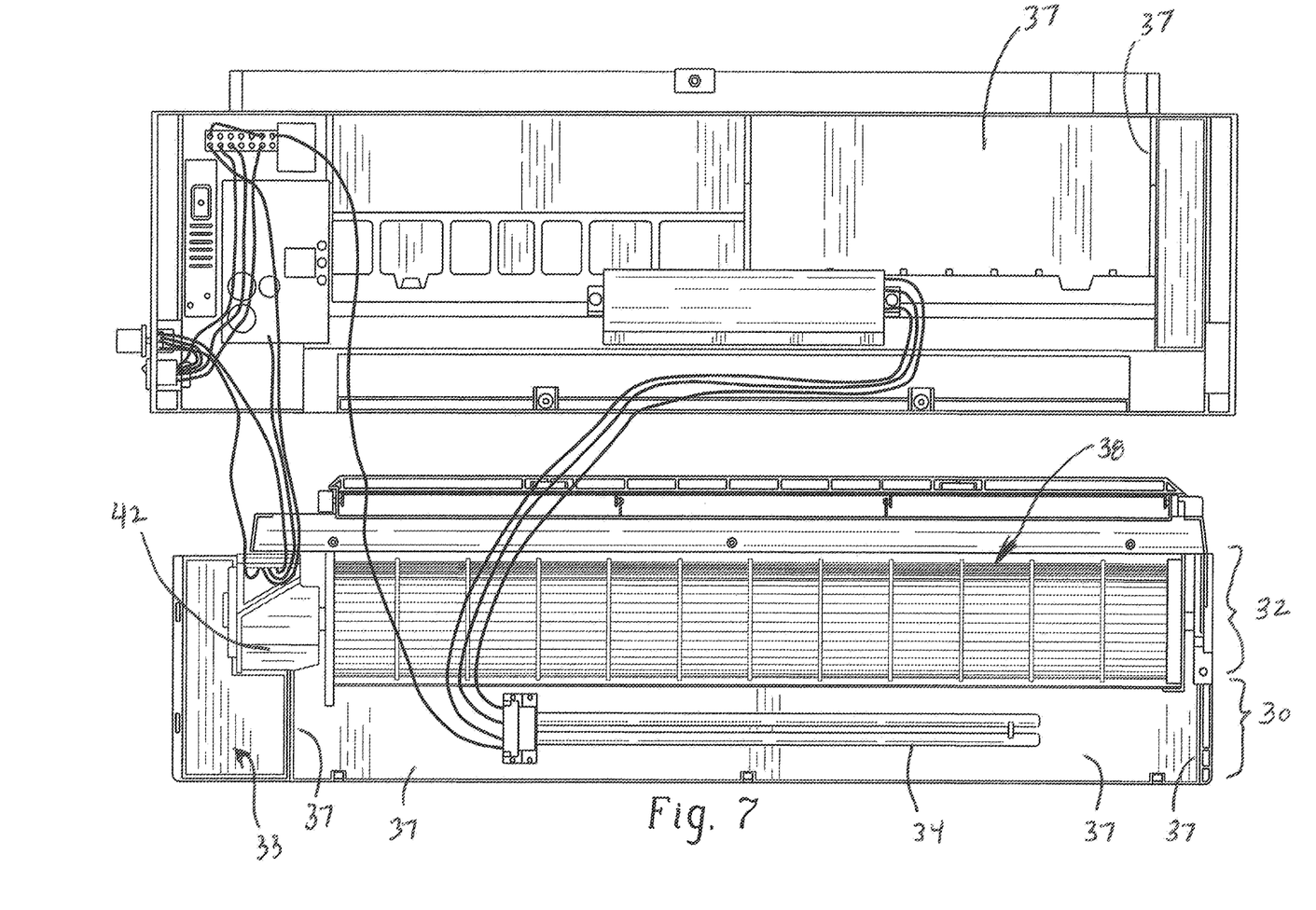
FIG. 7 is an interior perspective view of the air purifier system in an opened position in accordance with the present disclosure.

FIGS. 6-7 illustrate perspective views of an interior of the air purifier system when clam shell configuration of the housing 12 is opened. The interior generally includes an upper chamber 30, a lower chamber 32, and a compartment 33 offset from the upper and lower chambers 30, 32, respectively, for housing the electronics, e.g., control board, wherein the terms "upper" and "lower" are generally relative to ground. The upper chamber 30 generally includes a UV light source 34 and a cylindrical photocatalytic filter 36 spaced about the UV light source (see FIG. 8). The lower chamber 32 generally includes a fan unit 38.

The ultraviolet light source 34 is not intended to be limited and can include UVGI lamps, fluorescent light. UV emitting diodes, as well as any type of light source that emits UVA, UVB, and/or UVC, and the like. In one or more embodiments, the ultraviolet light source is a UVGI lamp configured to emit radiation at a wavelength of about 253.6 nanometers (nm) and is selected for its germicidal activity. The ultraviolet light source is completely contained within the housing such that the radiation cannot be viewed from outside system.

Suitable UV lamps are elongate tubes and can have a circular or a non-circular cross-sectional shape. In one or more embodiments, the mean level of radiation is greater than about 50.000 microwatts (μWsec/cm$^2$). In one or more other embodiments, the mean level of radiation is greater than about 70,000 μWsec/cm$^2$ and in still one or more embodiments, the radiation level may be higher than 100,000 μWsec/cm$^2$. The mean level of radiation is the average of the measured radiation level in a line along the center of the upper chamber aligned with the principal flow path axis of gas to be cleaned.

Figure 8:
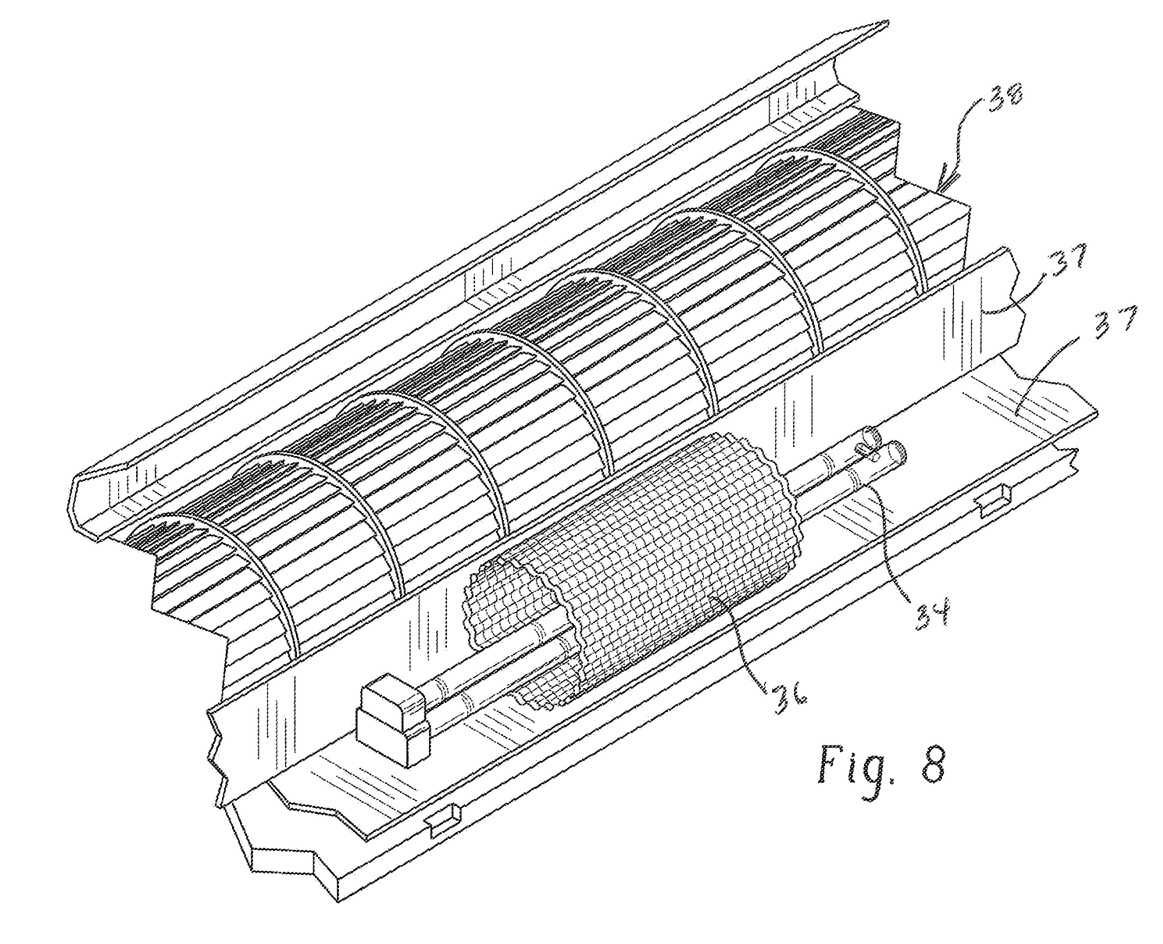
FIG. 8 is a partial interior perspective view of the photocatalytic filter in accordance with the present disclosure.

FIG. 8 shows a partial perspective view of the cylindrical photocatalytic filter 36, which includes a photocatalytic material on a surface thereof disposed about the ultraviolet light source 34. In one or more embodiments, the photocatalytic cylindrical filter 36 is pleated to increase the available surface area of the photocatalytic material. However, it should be noted that other than being disposed about the ultraviolet light source, the shape and number of pleatings are not intended to be limited. In other embodiments, the cylindrical material is of a mesh design.

In one or more embodiments, the photocatalytic material includes nanoparticle titania, which may be in the form of an aqueous solution(s) comprising nanoparticle titania. Desirably, the titania has an average particle size, as measured along a major axis (i.e., a longest axis), of less than or equal to 30 nanometers (nm), or, more particularly, less than or equal to about 20 nm, or, even more particularly, less than or equal to about 10 nm; e.g., an average particle size of about 5 nm to about 25 nm, or, specifically, about 8 nm to about 20 nm. The titania may be used in the form of particles or powder, or in the form of a sol. It may be used with wetting agent(s). For example, a polyethylene oxide silane (e.g., in amount of 1 to 10 percent of the dry weight of the film former (titanium peroxide sol)); such as Dow Chemicals Silicone Q25211 super wetting agent (a polyethylene oxide silane) can be used in combination with the titania. Optionally, an acrylic aliphatic urethane polymer can replace wholly or partially the titanium peroxide sol. Exemplary titania compositions are described in U.S. Pat. No. 6,884,752, to Andrews. One possible titania photocatalyst is commercially available from Prixmalite Industries. Inc, New York, N.Y., as TIOXOCLEAN® titanium dioxide solution. Not to be limited by theory, but for effectiveness, optical clarity, ease of application, durability, and/or adhesion, the titania can be nanoparticle size.

The titania can be disposed on the cylindrical filter to form the photocatalytic filter 46 and disposed about and spaced apart from the ultraviolet light source 34. The cylindrical filter can be selected from a material that has the desired porosity, is oxidation resistant, imparts structural integrity and, desirably, that can enhance the available titania surface area. For example, the cylindrical filter can be a porous medium such as a mesh, (e.g, a woven or non-woven material such as cloth), perforated sheet, and so forth. The titania can be coated on and/or through (hereinafter "on") the cloth, that can be plastic and/or metal, can comprise materials such as metal (e.g., stainless steel (such as 304 stainless steel), carbon steel, brass, and so forth), non-metal (such as cotton, silk, plastic (e.g., polyester, polyvinyl chloride, polycarbonate, polyarylene ether, pol styrene, and so forth), canvas, as well as combinations comprising at least one of the foregoing. In some embodiments, the porous medium provides sufficient structural integrity to support the titania, provides sufficient surface area, and/or enables sufficient fluid flow therethrough to attain a desired deodorization rate. For example, the porous medium can have an open area of greater than or equal to about 35%.

The mesh design can comprise openings that facilitate the passage of gas (e.g., air) and ultraviolet radiation from an ultraviolet light source, while adhering the coating. The mesh can have a number of openings, along one side, of greater than or equal to about 80 per inch (31.5 per centimeter (cm)), or, specifically, greater than or equal to about 100 per inch (39.4 per cm), or, more specifically, greater than or equal to about 110 per inch (43.3 per cm), and yet more specifically, great than or equal to about 120 per inch (47.2 per cm). Along the adjacent dimension (e.g., perpendicular direction), the number of openings can be greater than or equal to about 80 per inch (31.5 per cm), or, specifically, greater than or equal to about 100 per inch (39.4 per cm), or, more-specifically, greater than or equal to about 110 per inch (43.3 per cm), and yet more specifically, great than or equal to about 120 per inch (47.2 per cm). In other words, there can be about 100×110 openings per square inch (openings/in$^2$) (39.4/43.3 openings per square centimeter (openings/cm$^2$); i.e., 11,000 openings in a square inch (1.705 openings in a square centimeter). Desirably, there are greater than or equal to about 6.400 openings/in$^2$ (992 openings/cm$^2$), or, more specifically, greater than or equal to about 10.000 openings/in$^2$ (1,550 openings/cm$^2$), and even more specifically, greater than or equal to about 14.400 openings/in$^2$ (2,232 openings/cm$^2$).

The mesh thickness (e.g., wire % thread diameter) can be less than or equal to about 180 micrometers (μm), or, more specifically, less than or equal to about 150 μm, or, more specifically, less than or equal to about 120 μm, and, yet more specifically, less than or equal to about 90 μm. For example, in some embodiments, the diameter can be about 50 μm to about 120 μm. In other embodiments, the diameter can be about 120 μm to about 180 μm.

The square inch surface area of the wire cloth material is integral to its function by allowing millions of nanoparticles (microscopic) of the photocatalyst to adhere to the mesh. The surface area can be inversely calculated to the interior surface of the space, the concentrations of the coating, the number of coatings applied, and the opening size and thickness of the mesh.

By way of example, the coated mesh can be produced by several methods. Before coating, the porous medium can be cleaned if it is desirable to remove manufacturer coatings and/or contaminants. A titania solution can then be applied to the porous medium. Although the solution can comprise up to and even exceeding about 10 volume percent (vol %) nanoparticle titania, a solution comprising about 0.25 vol % to about 6 vol % is often employed, or, specifically, about 0.5 vol % to about 3 vol %, or, more specifically, about 1 vol % to about 2 vol %, balance water and optional wetting agent(s). For example, the solution can comprise about 0.5 vol. % to about 4 vol %, or, more specifically, about 0.5 vol % to about 2.5 vol % TIOXOCLEAN® titanium dioxide solution.

The titania solution can be sprayed onto the porous medium and optionally the housing, e.g., as a cool (e.g., not heated, such as tap water at about 65 to about 75° F.) or warm (e.g., heated, e.g., water at about 80° F. to about 90° F. (alternatively, or in addition, the unheated tap water could be employed yet the air temperature increased to about 85° F. to about 90° F.)) vapor mist produced by compressed gas (e.g., air, nitrogen, or the like), or gas propelled aerosol can mixed with the titania solution (e.g., TIOXOCLEAN® titanium dioxide solution) and sprayed on both surfaces (2 dimensional surface) as well as the plastic frame. The titania solution can also be applied by immersing (dipping) the porous medium into the solution, either as an assembled unit (porous medium in the frame) or in sub-component parts before final assembly. Alternatively, or in addition, the porous medium can be pre-soaked m the solution while still in roll form, e.g., before the porous medium is cut to size for insertion into the housing.

The solution can then be actively (e.g., with blowers and/or heat (e.g., heated air, heating the porous medium, and so forth), or passively (allowed to air dry in ambient conditions) dried before applying an optional subsequent coating. Although a single coating can be used, it is preferred to apply several (e.g., 2, 3, or even 4) coatings of the solution to the mesh to attain a fully coated surface with good adhesion and sufficient reactivity.

An exemplary coating technique comprises spraying with clean compressed air (e.g., in 1 to 4 coating, or, more specifically, in two coatings). The first coating can be a light coating of $TiO_2$, on one or both sides of the screen, to pre-coat the screen, e.g., allowing the surface to dry in a gas stream. The gas stream can be any inert gas that does not adversely react with the coating, such as an air stream. The drying temperature can be room temperature or warmer. e.g., it can be a temperature of about 80° F. (27° C.) to about 90° F. (32° C.). The screen can then be coated, e.g., on both sides, with the second coat; again, drying with an air stream. The drying can be accomplished in various fashions such as by passing the coated screen material through a tunnel with warm air blowing therethrough, and/or by using a surface fan blowing warm air on the porous medium surface.

In another embodiment, the porous medium (e.g., screen) can be rolled after it is drawn into a submerged bath of the $TiO_2$ formula. The ribbon of screen can be drawn into and submerged in a bath of solution. As it rises out of the bath, it can be passed through rollers, spaced evenly above and below the ribbon material to form a squeegee effect, drawing the liquid and droplets off, forming a smooth, even coating of the material, and thereby uniformly coating the entire screen open surface. The same drying methods as above can be used. The screen can then optionally be passed through the bath process again before the material is sheared to the correct length for insertion into the screen frame. In yet another embodiment, the bottom roll can be immersed in a reservoir of the $TiO_2$ formula, creating a wick effect on the lower roller. This can allow the screen material to become saturated with the formula and allow the upper roller to wring the excess material off as it leaves the rollers. Exemplary roller materials include plastic and rubber rollers, such as neoprene, nitrile, and/or urethane. The nip (e.g., the space between the rollers) can be sufficient to receive the screen and allow the desired coating thickness. For example, the space can be less than or equal to about 50 micrometers.

Optionally, the $TiO_2$ formula can be heated, e.g., to a temperature of about 100° F. (38° C.) to about 140° F. (60° C.), prior to its application. Not to be limited by theory, it is believed that heating the formula enhances the ability for the water portion of the formula to evaporate, thereby enabling a significant decrease in curing time and allowing production to increase.

In other embodiments, water (e.g., cold water such as distilled water, at about 70° F.) along with the photocatalyst can be applied to a support as a vapor mist. For example, the water (distilled water) and photocatalyst can be sprayed from a vapor production nozzle (e.g., capable of producing a vapor having an average water particle diameter of in a less than or equal to about 25 micrometer (μm) range (or, more specifically, an about 7 μm to about 12 μm range). This can, for example, enable enhanced porous medium penetration, as well as photocatalyst dispersion and coatability on the porous medium. The photocatalyst is then desirably allowed to dry on the porous medium in ambient air. Optionally, the relative humidity can be maintained (under the given environmental temperature) at less than or equal to about 60%, e.g., about 15% to about 50%, to facilitate drying. The natural evaporation of the droplets leaves sub-micrometer sized titania particles with improved adhesion. e.g., (not to be limited by theory) adhesion is believed to be on the molecular level. Additionally, multiple layering, namely a total of 3 layers of the solution, enabled complete porous medium (e.g., mesh) coating while not clogging the openings nor allowing the material to clump on the surface. Clumping would inhibit air and sunlight to freely pass through the porous medium and efficiently employ all dimensions of the porous medium.

The coated porous medium is very stable and can be handled after the coatings are applied. The coating is achieved on a molecular level achieved by electrical adhesion of the nanoparticle $TiO_2$ material to its surface. The coated mesh can be wound in lengths of about 100 feet to about 400 feet (30 meters to 150 meters) and optionally stored for later use. When used, the mesh can be sheared in lengths to lit the insert of the frame (which will be determined by the size of the frame being produced); e.g., a male insert is placed in the female frame such that the two halves can be attached together (e.g., can be sonic welded together) forming a permanent sealed bond.

The photocatalytic filter 46 can be secured to the housing 12 using any fastening means including tape, adhesives, clips, and or the like. In one or more embodiments, both the ultraviolet light source 34 and the photocatalytic filter 46 disposed about the light source are secured to a rearward support of the housing when the system 10 is attached to a vertical wall.

The upper chamber 30 can be lined and/or coated with a reflective material 37. By way of example, the upper chamber 30 can be lined with aluminum sheeting. The presence of the reflective material 37 reflects light emitted from the UV light source 34 and increases photoactivity of the photoactive filter 36 about the ultraviolet source 34 by as much as about 50%. In one or more embodiments, the reflective material 37 is a flat surface and/or a concave surface as viewed from the major axis of the air flow.

Figure 9:
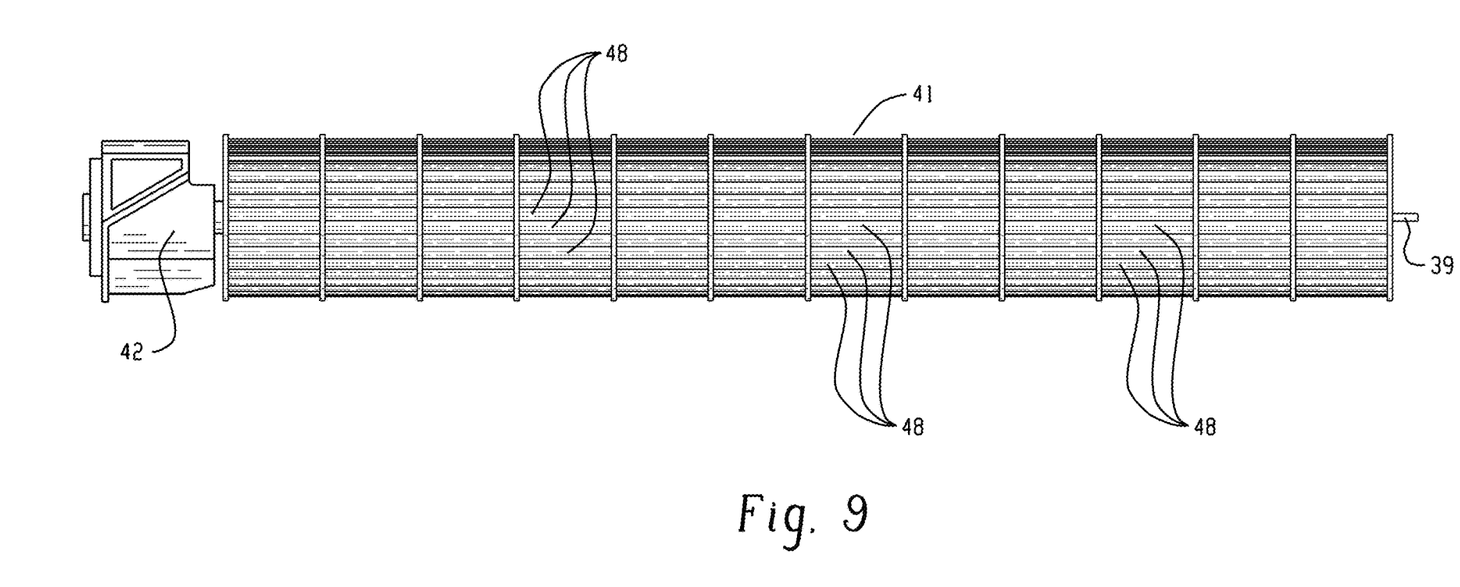
FIG. 9 is a perspective view of the fan unit including a DC motor coupled thereto at one end for use in the air purifier system in accordance with the present disclosure.

The fan unit 38 is horizontally mounted within the lower chamber 32 and includes a squirrel cage design 41 as is generally known in the art. As shown in the perspective view of FIG. 9, the fan unit 38 includes rotatable spindles at each end of the squirrel cage 41 to effect rotation, wherein one end (not shown) is rotatably connected to a DC motor 42 and the other end is a floating spindle 39 that is configured to be connected to a bearing (not shown) mounted within a sidewall of the housing 12 for vibration adsorption. The squirrel cage 41 includes a plurality of vanes 48 configured to direct air in though the inlet opening 14 and towards the outlet opening 16. In one or more embodiments, the fan unit 38 is configured to provide an air flow rate within a range of about 85 to about 725 cubic feet per minute (CFM). In one or more other embodiments, the fan unit 38 is configured to provide an air flow rate within a range of about 95 to about 800 CFM, and in still other embodiments, the fan unit 38 is configured to provide an air flow rate within a range of about 70 to about 660 CFM.

During operation of the fan unit 38 in the air purifier system 10, untreated air flows through the carbon pre-filter 26 and through the particulate filter 28 and into the upper chamber 30, wherein the air flow is then exposed to the ultraviolet light source 34 and the photocatalytic filter 36 about the ultraviolet light source within the upper chamber 30. The air flow then passes from the upper chamber 30 and into the lower chamber 32, wherein it is subsequently discharged by the fan unit 38 into the environment via the outlet opening 16. The fan unit 38 in the lower chamber 32 is configured to draw air through the inlet opening 14 to the outlet opening 16.

As contaminated air (e.g., air comprising an odor, viruses, bacteria and/or the like), moves across and/or through the photocatalytic filter 36 in the presence of UV light, any airborne pathogens are destroyed and any odors are reduced and/or eliminated. Not to be limited by theory, it is believed that the contaminated air is drawn into a hydroxyl radical field generated by reaction of air with the UV activated photocatalytic filter where oxidation occurs. Subsequently, organic compounds are converted into carbon dioxide and water, thereby rendering odor causing substances inert, e.g., deodorized and deactivated, as well as destroying any airborne pathogens since these materials are typically organic.

Figure 10:
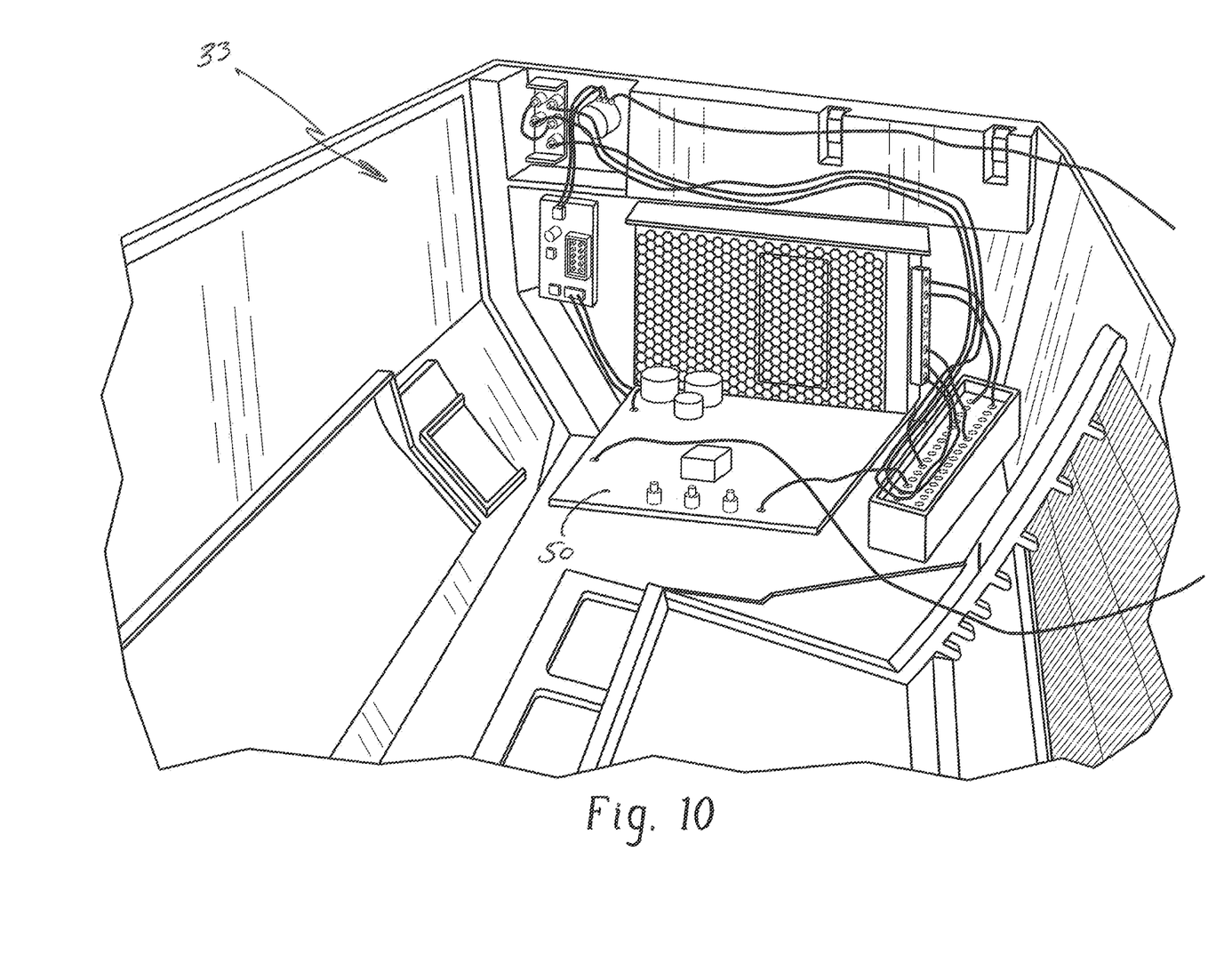
FIG. 10 is a perspective view of the offset compartment for housing electronics associated with operating the air purifier system in accordance with the present disclosure.

The system 10 can include insulation and the like to provide noise dampening. Operations internal to the unit can be DC powered through a primary inverter providing 5.5 volts to 310 volts for smooth, quiet, and safe operation. As is generally shown in FIG. 10, the control board 50 including electronics such as a power inverter, capacitor, controls, and the like can be located within the offset compartment 33 housing the electronics and is kept cool, producing about 1 to about 3 degrees Fahrenheit of heat, which would have no noticeable change to the interior air space or the ambient temperature of that air. The power consumption can be configured to be less than 3 amps during normal operational function.

An operating panel and/or controls and/or indicators can be provided on an external housing surface of the system. The particular location is not intended to be limited and is preferably placed in a location configured for ease of access and visibility. The operating panel and/or controls and/or indicators may include an on/off switch, a speed control knob for controlling the speed of the fan motor and indicators for indicating the condition of operation of the ultraviolet lamps and of the primary filter. In one example, the indicators include a normally unlighted red indicator lamp which, when lighted, indicates that the particulate filters requires replacement and a normally lighted green indicator lamp which, when unlighted, can be configured to indicate that one or the other of the ultraviolet lamps requires replacement. In other examples a digital status display providing various status codes or the like can be provided.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air purifier system for use in an enclosed environment comprising:

a housing having an inlet opening and an outlet opening in fluid communication with a housing interior, wherein the housing interior comprises an upper chamber in fluid communication with both the inlet opening and a lower chamber, wherein the lower chamber is in fluid communication with the outlet opening;

a removable filter disposed at the inlet opening comprising a carbon pre-filter and a particulate filter, wherein the carbon pre-filter comprises a membrane impregnated with activated carbon overlaying the particulate filter;

an ultraviolet light source and a photocatalytic filter disposed about the ultraviolet light source in the upper chamber, wherein the carbon pre-filter prevents emission of light from the ultraviolet light source from emanating through the inlet opening; and a fan unit in the lower chamber, wherein the fan unit is configured to horizontally draw environmental air through the removable filter at the inlet opening and into the upper chamber, wherein the air is exposed to ultraviolet radiation from the ultraviolet light source to react with organic contaminants so as to further reduce odor and destroy pathogens, and wherein the air is then directed by the fan unit into the lower chamber and discharged through the outlet opening for return to the environment free of odor and organic contaminants.

2. The air purifier system of claim 1, further comprising an ultraviolet radiation reflector on one or more of the interior surfaces defining the upper chamber.

3. The air purifier system of claim 1, wherein the ultraviolet radiation reflector comprises polished aluminum mirror.

4. The air purifier system of claim 1, wherein the ultraviolet light source emits radiation at a wavelength of about 253.6 nm.

5. The air purifier system of claim 1, wherein the ultraviolet light source emits ultraviolet C radiation.

6. The air purifier system of claim 1, wherein the particulate filter has a minimum efficiency reporting vale (MERV) rating greater than 13.

7. The air purifier system of claim 1, wherein the particulate filter has a minimum efficiency reporting vale (MERV) rating within a range of 10 to 20.

8. The air purifier system of claim 1, wherein the fan unit is configured to provide a flow rate withing a range of to about 725 cubic feet per minute.

9. The air purifier system of claim 1, wherein the outlet opening comprises a movable discharge grill for directing the air from the system and into the environment.

10. The air purifier system of claim 1, wherein the photocatalytic filter disposed about the ultraviolet light comprise titania coated onto a porous oxidation resistant support.

11. The air purifier system of claim 1, wherein the photocatalytic filter disposed about the ultraviolet light is cylindrically shaped.

12. The air purifier system of claim 1, wherein the photocatalytic filter has an open area of greater than or equal to about 47% and has greater than or equal to 10,000 openings/in$^2$.

13. An air purifier system for use in an enclosed environment comprising:
    a housing having an inlet opening and an outlet opening in fluid communication with a housing interior;
    a removable filter disposed at the inlet opening comprising a carbon pre-filter and a particulate filter, wherein the carbon pre-filter comprises a membrane impregnated with activated carbon overlaying the particulate filter;
    an ultraviolet light source configured to produce UVC radiation and a cylindrical shaped photocatalytic filter disposed about the ultraviolet light source, wherein the carbon filter prevents emission of the UVC radiation from the enclosed environment; and
    a fan unit, wherein the fan unit is configured to horizontally draw environmental air through the removable filter at the inlet opening, through the photocatalytic filter, and discharged through the outlet opening for return to the environment free of odor and organic contaminants.

14. The air purifier system for use in an enclosed environment of claim 13, wherein the system is mounted to a wall within the enclosed environment and the inlet opening is provided in an upper surface of the housing the outlet opening is provided in a lower surface of the housing.

15. The air purifier system for use in an enclosed environment of claim 14, wherein the outlet opening comprises a movable discharge grill configured to direct the flow of air within the enclosed environment.

16. The air purifier system for use in an enclosed environment of claim 13, wherein the photocatalytic filter disposed about the ultraviolet light comprise titania coated onto a porous oxidation resistant support.

17. A process for purifying air within an enclosed environment, the process comprising, in sequence:
    drawing air into a removable filter provided at an inlet opening of an air purifier system to reduce odors and particulate matter within the air, wherein the removable filter comprises a carbon pre-filter including a membrane impregnated with activated carbon and a particulate filter;
    flowing the reduced odor and particulate matter air through a photocatalytic filter, wherein the photocatalytic filter comprises an ultraviolet light source and a cylindrical filter impregnated with a photocatalytic material about the ultraviolet light source to form a purified air flow free of odor and particulate matter, wherein the carbon pre-filter overlies the particulate filter and substantially prevents emission of the ultraviolet light from the air purification system; and
    discharging the purified air flow from an outlet opening into the enclosed environment.

18. The process of claim 17, wherein discharging the purified air flow from the outlet opening comprises directing the purified air flow with a movable discharge grill.

19. The process of claim 17, wherein flowing the reduced odor and particulate matter air through a photocatalytic filter destroys airborne pathogens therein.

20. The process of claim 17, wherein the photocatalytic material comprises titania.

21. The process of claim 17, wherein the particulate filter is a high efficiency particulate air (HEPA) filter having a minimum efficiency rating volume (MERV) greater than 13.

22. The process of claim 21, wherein drawing air into and out of the air purifier system is at a flow rate within a range of about 85 to about 725 cubic feet per minute.

* * * * *